United States Patent
Hukset

(10) Patent No.: US 12,247,454 B2
(45) Date of Patent: Mar. 11, 2025

(54) SUBSEA EROSION SENSOR

(71) Applicant: Siemens Energy AS, Oslo (NO)

(72) Inventor: Einar Ove Hukset, Stord (NO)

(73) Assignee: Siemens Energy AS, Oslo (NO)

( * ) Notice: Subject to any disclaimer, the term of this patent is extended or adjusted under 35 U.S.C. 154(b) by 270 days.

(21) Appl. No.: 17/902,955

(22) Filed: Sep. 5, 2022

(65) Prior Publication Data

US 2023/0089515 A1 Mar. 23, 2023

(30) Foreign Application Priority Data

Sep. 23, 2021 (GB) .................. 2113580

(51) Int. Cl.
*G01N 17/04* (2006.01)
*E21B 33/038* (2006.01)

(52) U.S. Cl.
CPC ......... *E21B 33/0385* (2013.01); *G01N 17/04* (2013.01)

(58) Field of Classification Search
CPC .. E21B 33/0385; G01N 17/04; G01N 17/006; G01N 27/041
See application file for complete search history.

(56) References Cited

U.S. PATENT DOCUMENTS

| | | | | |
|---|---|---|---|---|
| 5,740,863 A | * | 4/1998 | Ortloff | E21B 47/10 166/368 |
| 10,732,096 B2 | * | 8/2020 | Denenberg | G01N 27/902 |
| 11,674,914 B2 | * | 6/2023 | Hutchinson | G01N 27/07 324/650 |
| 2006/0002815 A1 | | 1/2006 | Harris et al. | |
| 2023/0243737 A1 | * | 8/2023 | Balmond | G01N 27/04 324/700 |

FOREIGN PATENT DOCUMENTS

| | | | | |
|---|---|---|---|---|
| CN | 105891324 A | * | 8/2016 | |
| CN | 111721619 A | * | 9/2020 | G01N 17/006 |
| EP | 2124034 A1 | | 11/2009 | |
| GB | 2501184 A | * | 10/2013 | G01N 17/02 |
| GB | 2527324 A | * | 12/2015 | G01F 1/58 |
| GB | 2623048 A | * | 4/2024 | E21B 33/035 |
| KR | 102111161 B1 | * | 6/2020 | |
| WO | 2021075698 A1 | | 4/2021 | |

* cited by examiner

*Primary Examiner* — Octavia Hollington

(74) *Attorney, Agent, or Firm* — Wolter Van Dyke Davis, PLLC

(57) ABSTRACT

An erosion sensor includes a plurality of individual sensing elements arranged in a stack. Each sensing element is separated from an adjacent sensing element by an electrically non-conducting material. The erosion sensor further includes a reference sensing element, the reference sensing element being separated from the closest sensing element, of the plurality of individual sensing elements, by an electrically non-conducting material. Each sensing element has a thickness of at least 0.25 mm.

18 Claims, 4 Drawing Sheets

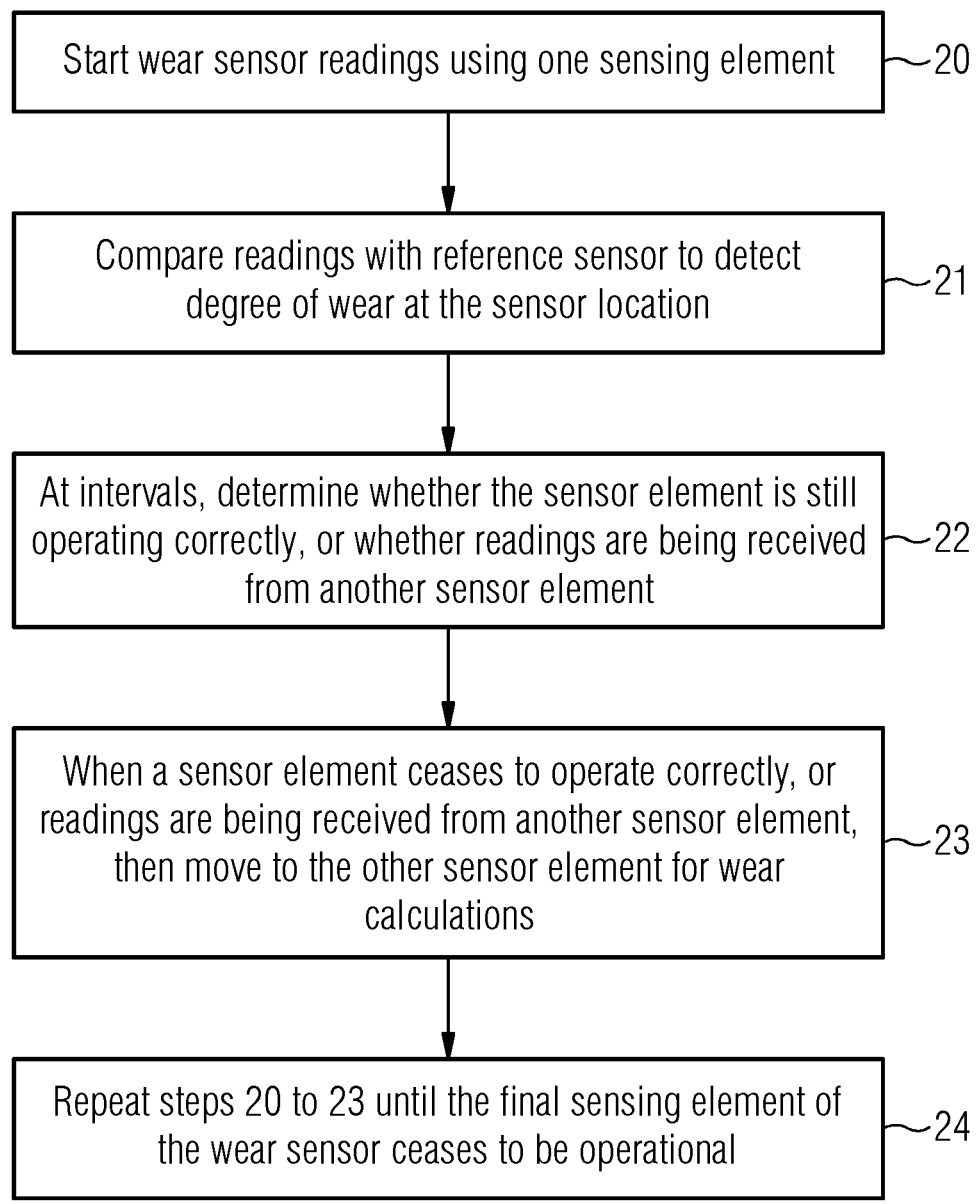

SUBSEA EROSION SENSOR

CROSS REFERENCE TO RELATED APPLICATIONS

This application claims the benefit of United Kingdom Application No. GB 2113580.1 filed 23 Sep. 2021, incorporated by reference herein in its entirety.

FIELD OF INVENTION

This invention relates to a subsea erosion sensor, in particular for sensing erosion that occurs subsea, or underwater and an associated method.

BACKGROUND OF INVENTION

In oil and gas exploration, pipelines laid subsea are difficult to access and expensive to maintain or repair, requiring hire of specialised vessels and use of divers. However, the consequences of a pipeline failure due to gradual wear of the pipeline material itself, typically caused by erosion, may be significant. Thus, it is desirable to be able to monitor the state of the subsea pipeline and take steps to mitigate damage, or schedule repairs when a vessel is going to be on site for other reasons. Conventionally, erosion sensors have a single sensor to be eroded, which is subjected to the same harsh environment as the equipment or pipeline being monitored and a second, reference, sensor that is protected from that environment and allows a comparison to determine the state of the pipeline.

However, existing sensors are themselves expensive and have to be replaced as a matter of course over the lifetime of the pipeline. An improved sensor design is desirable.

SUMMARY OF INVENTION

In accordance with a first aspect of the present invention, a subsea erosion sensor comprises a plurality of individual sensing elements arranged in a stack; each sensing element being separated from an adjacent sensing element by an electrically non-conducting material; the subsea erosion sensor further comprising a reference sensing element, the reference sensing element being separated from the closest sensing element, of the plurality of individual sensing elements, by an electrically non-conducting material; and wherein each sensing element has a thickness of at least 0.25 mm.

The stacked sensor enables erosion related wear of the pipeline to be detected, so that changes to the operation may be made to reduce the rate of wear.

The electrically non-conducting material may comprise a thermoplastic, such as polyether ether ketone (PEEK).

Each sensing element may further comprise electrical conductors electrically connected at each end of the sensing element to measure a material property of the sensing element.

The electrical conductors may comprise a metal alloy, in particular, a Nickel-Chromium based alloy, such as alloy 625.

The erosion sensor further comprises an electrically conducting outer housing containing the sensing elements.

The material of the outer housing may comprise a metal alloy, such as alloy 625.

The part of the subsea erosion sensor subject to process fluid may have a total thickness of at least 2 mm of erodible sensing layers. The erosion sensor may comprise at least eight sensing elements. Each sensing element may have a thickness of between 0.25 mm and 0.6 mm.

The sensing element may comprise one of a spiral of constant thickness, or a discontinuous circle, square or rectangle, with or without rounded corners.

In accordance with a second aspect of the present invention, a subsea sensing probe comprises a subsea erosion sensor according to the first aspect.

In accordance with a third aspect of the present invention, a method of detecting erosion in a subsea erosion sensor to the first aspect comprises installing the subsea erosion sensor in a process fluid pipeline such that at least one of the plurality of individual sensing elements is exposed to the process fluid and the reference sensing element being located such that it is protected from the process fluid; detecting an electrical or material property in a first sensing element of the plurality of sensing elements; detecting an electrical or material property in the reference sensing element; comparing outputs derived from the sensing element and the reference sensing element; determining when the sensing element has been eroded by an amount exceeding a threshold value; and switching to the next sensing element of the plurality of sensing elements.

The method may further comprise converting the detected electrical or material property to a thickness measurement for both the sensing element and the reference element before carrying out the comparison. This thickness measurement is typically a continuous thickness measurement.

The method may further comprise detecting electrical or material properties of multiple erosion sensing elements in the erosion sensor simultaneously.

The method may further comprise determining the total thickness required to calculate projected erosion in a given environment and installing an erosion sensor having sufficient elements for a projected lifetime.

The erosion sensor may be implemented in an intrusive probe design, arranged flush with or angled in the process flow.

BRIEF DESCRIPTION OF THE DRAWINGS

An example of a subsea erosion sensor and associated method in accordance with the present invention will now be described with reference to the accompanying drawings in which.

DETAILED DESCRIPTION OF INVENTION

Figure 1:
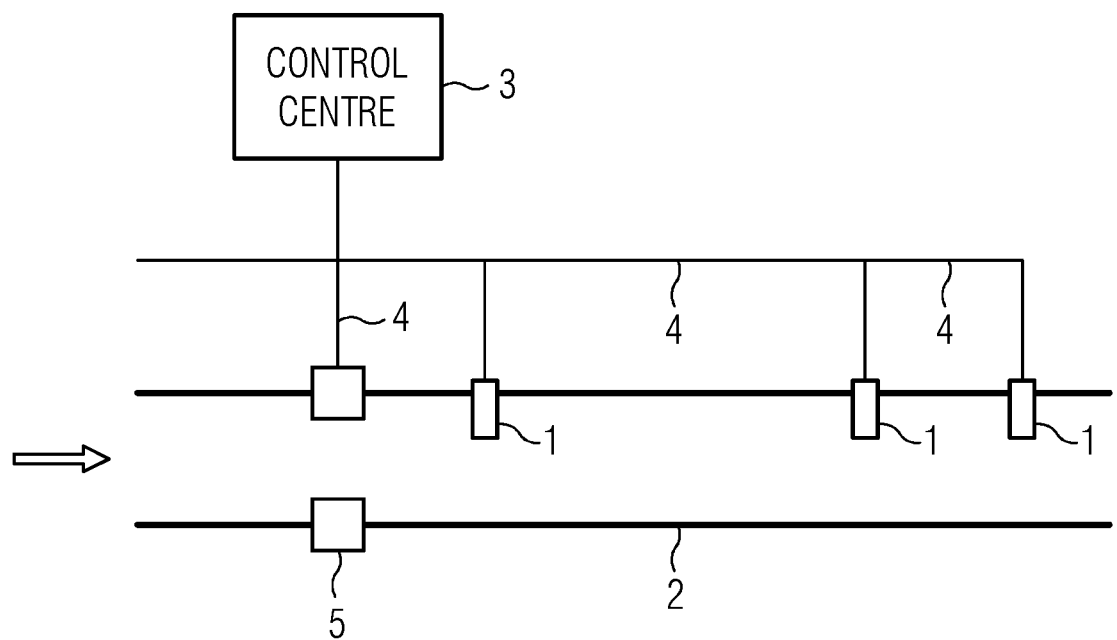
FIG. 1 illustrates an example of a typical subsea pipeline system in which an erosion sensor according to the present invention may be used.

The drive to reduce overall lifecycle costs, both capital expenditure (CAPEX) and operational expenditure (OPEX), associated with deep-water oil and gas developments means that improvements to existing designs, manufacturing processes and operation are desirable. Reducing operational costs of maintenance of subsea equipment relies on remote monitoring of the status of the equipment and adapting the operation to reduce the rate of wear, or scheduling equipment replacement to coincide with other works that also require vessel or diver services, to reduce the overheads.

The present invention addresses the difficulties encountered with such remote monitoring of gradual wear using conventional subsea erosion sensors. Conventional erosion sensors typically measure electrical resistance, for example, to be able to determine how eroding material such as sand has affected the wall thickness of a process pipeline. In sensing systems that use intrusion sensors, i.e., sensors that are subject to the same wear damage as the equipment or pipeline because they are directly in the process fluid flow, the sensors eventually wear out. Electrical resistance erosion elements are normally designed as one sensing element in various shapes subjected to erosion, and one or two reference elements not subjected to erosion. Increasing the thickness of the sensor element would extend how long the sensor lasts, but electrical resistance measurements become smaller as the thickness of a sensing element increases and changes in electrical resistance ever smaller still, so the changes become too hard to detect. To be able to install wear sensors that have a similar lifespan to the pipeline or equipment being monitored, an alternative approach is required.

WO2021075698 describes a corrosion sensor for a gas pipeline which has three layers of different thickness, of 80 microns or less. Although this may be appropriate for corrosion sensing for onshore oil and gas pipelines, such an arrangement is not suitable for erosion sensing in subsea pipelines, as it would be eroded far more quickly than the lifetime of the pipeline, leaving a long period of operation, where no data could be obtained about the rate or extent of wear.

In a subsea erosion sensor according to the present invention, to detect erosion, or wear due to detrimental particles in process media, each individual sensing element is kept as thin as possible, but within a range of thickness that meets the aim of accurate readings over a sufficiently long period of time and multiple sensing elements are stacked, i.e., arranged in parallel, with a separation layer between each sensing element. Additionally, a reference sensing element is provided, separated from an adjacent sensing element by an electrically non-conducting material. This stacking of sensing elements, in combination with a reference sensor, forms a sensor that is thick enough to last over a forecast lifetime of the pipeline, equipment, or product, based on normal operating conditions, but which has improved accuracy compared with a conventional single element sensor.

The sensing elements themselves of the erosion sensor of the present invention have a relatively simple design that may be mass produced. The sensing elements may take various shapes that achieve a long sensor element in a relatively limited overall area, such as spirals, which may be continuous or discontinuous; discontinuous squares or rectangles, with or without rounded corners, or other shapes that will be apparent to the skilled person. The number of sensing elements in any particular erosion sensor may then be adapted to the intended use of that specific sensor relatively easily and the manufacturing costs are kept down by using simple, mass produced sensing elements and building up the sensor from those. Such an erosion sensor may be incorporated into an existing probe in a pipeline, or installed as a stand-alone item in the pipeline. Each sensing element in the erosion sensor is separated from a neighbouring sensing element by a layer of an electrically insulating material, so that each element supplies individual resistance values to monitoring or control electronics in a sensor system. For convenience, the sensing elements are manufactured to have the same thickness and then multiple sensing elements are stacked together, separated by electrically insulating layers, which are also of a common thickness, although not necessarily of the same thickness as the sensing layers. This reduces the number of distinct parts that need to be made and stocked, simplifies assembly and so reduces costs.

As mentioned above, electrical resistance erosion sensing elements give a very small measurement value for the resistance, typically in milliohms and use a change in resistance measured to indicate erosion has occurred by converting the measured resistance change to a representative thickness change. This change in thickness is calculated, but typically the values are of the order of micrometres. An erosion sensor having a single sensing element in the conventional manner, that needed to have a thickness sufficient for a lifespan of 25 to 30 years of operation, would not produce a measurable result for thickness change because the ohm value of resistance decreases as the element thickness increases. Simply making the element thickness sufficient to endure through the expected lifespan results in too low resistance in nano-ohm to be measured with the accuracy needed for an intrusive non-retrievable erosion sensor to be placed subsea. This means that such sensing elements have to be replaced over the lifetime of the pipeline or other equipment with which they are used.

By constructing a subsea erosion sensor from multiple sensing elements that have been stacked together, to detect erosion as described in more detail hereinafter, the problems associated with reduction in readable value for any change in measured resistance may be addressed. In the design according to the present invention, the conventional single thick electrical resistance element is replaced by multiple thin electrical resistance elements stacked between sheets of a suitable insulating material, for example, a thermoplastic, such as polyether ether ketone (PEEK). Sensed data readings are typically transmitted only from the operative sensing elements, for example, from the outermost sensing element, i.e. the one closest to the process fluid, and the reference element, which is protected. These readings are transmitted to control or monitoring electronics, where the received data is processed. In certain circumstances, the control and monitoring system may determine that an operative sensing element is no longer performing correctly, for example, for the outermost sensor, if the sensing element has been worn down too much. In that case, data will start to be received from the next sensor in, instead.

FIG. 1 illustrates a typical installation in which an intrusive subsea erosion sensor may be installed. One or more erodible sensors 1, each comprising a plurality of erosion sensing elements, may be installed in a pipeline 2 or other media carrying body and be exposed to process media, which may for example, comprise a process fluid such as gas, or oil, together with water, as well as sand and/or chemicals. The sand, in particular, may cause erosion of the pipeline and the erosion is affected by the rate at which the sand and other material flows through the pipeline. Corrosion may be caused, for example, by sour service process media that is too harsh for the material grades used. Components downstream of the sensor may have been mechanically damaged by some other cause, which may also produce particles that wear down the pipeline and other wetted parts. Having multiple sensors in the pipeline allows particular issues to be located more easily, although an alternative would be to have a single sensor where the process media enters a pipeline section. Data from the, or each, sensor may be collected in a control centre 3, the data being received at the control centre via communications lines 4. The control centre may be either subsea or topside, or at a remote location, for example when used as a part of an automated condition monitoring system. The received data may be monitored by operators or to automated to some extent. When detrimental erosion, rates are detected, the operator may send a control signal to the control centre and through communications lines 4 to a valve actuator 5, upstream of the sensor to reduce the flow rate of the process media in the pipeline section. In an automated system, this may be done in response to a trigger value being reached. Accurate measurement of the rate of erosion allows changes to be made to the extraction process to reduce the amount of damage being done, if the rate of erosion of the pipeline is deemed to be too high.

Figure 2:
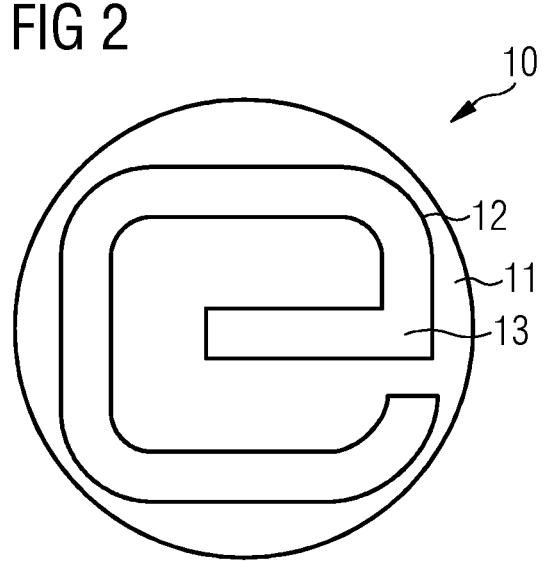
FIG. 2 illustrates a first example of an erosion sensor according to the present invention.

FIG. 2 shows more detail of a sensor 10 comprising multiple sensing elements 13. The sensor comprises an electrically conducting body 11, or outer housing, to contain the sensing elements. The front of the electrical resistance sensing element 13 in this example is formed in an open "e" shape to make good use of available space in the erosion sensor probe 1 and sensor 10, but other shapes may be used, such as closed or open loops, discontinuous circle, square or rectangles, with or without rounded corners, C-shaped, or closed or open spiral shapes, for example as shown in more detail in FIGS. 4 and 5 and described hereinafter, as these make best use of the available area in the sensor, for the best possible length of the erosion element.

Element thickness has a major impact of the resistance value. Thinner elements give a higher Ohm value making better resolution possible. For example, a conventional single unit element needs to be 6 mm thick to endure the expected wear for 15 to 20 years, but no more than this because of the adverse affect on accuracy. A conventional 6 mm thick single sensor element typically has a 45 micrometre tolerance of erosion measurement output. By contrast, in the present invention, a 0.25 mm thick sensor element 13 as part of a stacked sensing element, may achieve a resolution of 1 micrometre. The sensor thickness typically has a minimum thickness of 0.25 mm for each element 13 with a total thickness of the stacked layers being at least 2 mm, excluding the isolation layers in between, i.e. using eight elements. The sensor typically is formed of sensing elements with a maximum thickness of 0.6 mm for each element 13, with in that case, a minimum total thickness of 6 mm, excluding the isolation layers in between, i.e. 10 elements. However, subject to these outer limits, the layer thickness or total erodible thickness is not restricted to the specific values of these two examples and other values are equally valid.

In the examples given, the body 11 of the sensor comprises a metal alloy, for example a Nickel-Chromium based alloy, such as alloy 625, as does the sensing element 13 itself. Alloy 625 is suitable for most sour service, but depending on process media and pipe material, other materials grades may be used as long as the material is corrosion resistant for the actual media, compatible to the pipe material, and has an acceptable electrical conductivity.

Each sensing element 13 is separated from its neighbour by a layer 12 of insulating material, in this example, PEEK. Other non-conductive materials may be used, provided that the material integrity is not detrimentally affected by process media, other than when exposed to erosion after the sensing element above in the stack has been worn away. Each sensing element in the sensor 10 is provided with electrical conductors 15, also in this example made of alloy 625, which connect the sensing elements and the reference sensing element 16 through a high pressure penetrator (not shown) to sensor electronics in the control and/or monitoring unit (3). The conductors 15 connect to each end of each sensing element, providing power input to the elements 13 and output the measured material properties of the sensing element, typically resistance values, to the electronics unit.

Figure 3:
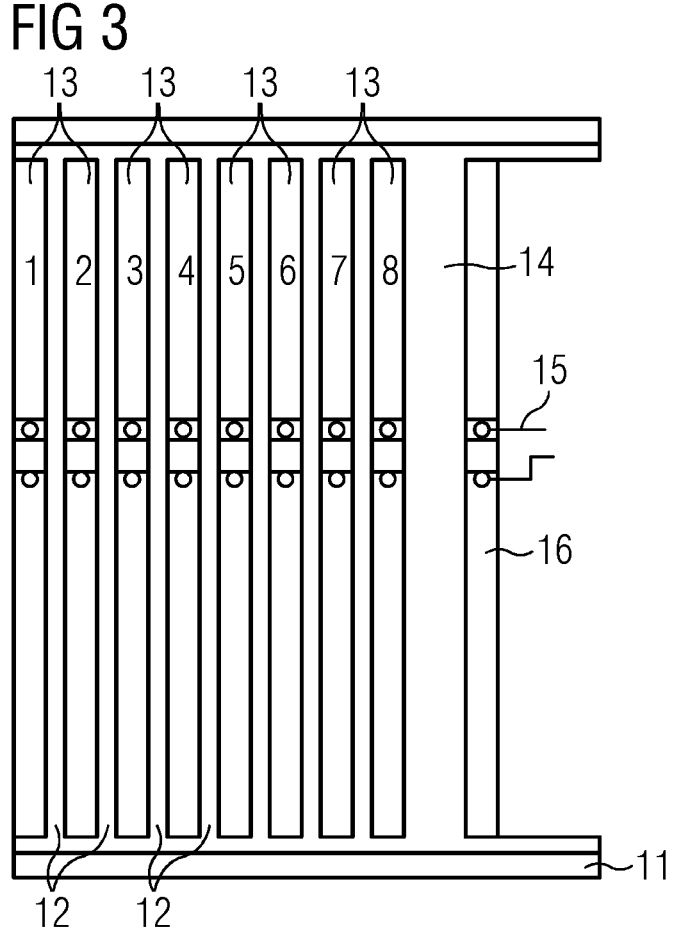
FIG. 3 shows more detail of the erosion sensor of FIG. 2.

The cross section of FIG. 3 shows multiple sensing elements 13 in a row, each having a thin electrically isolating layer 12, in this example PEEK, between one element and the next. A total of eight elements 13 are shown in this example to replace the single element that would be present in a conventional erosion sensor. Each of the elements, in this example, has a thickness of 0.25 mm giving a good and readable resolution of the resistance value compared to the single 6 mm element conventionally used, giving a total thickness of the sensor 10 exposed to the process fluid of at least 2 mm. However, the thickness of each one of the sensing elements 13 may be up to 0.6 mm, without unreasonably affecting the accuracy, which for a ten element sensor would give a sensor thickness, exposed to process fluid, of at least 6 mm. The overall thickness is increased by the thickness of the separating layers of electrically insulating material, for which a typical value may be 0.1 mm per layer. The reference sensor may be isolated with a thicker insulation layer depending on probe design, or placed separately inside the probe. All elements 13 have two alloy 625 conductors 15 attached for resistance readings.

Figure 4:
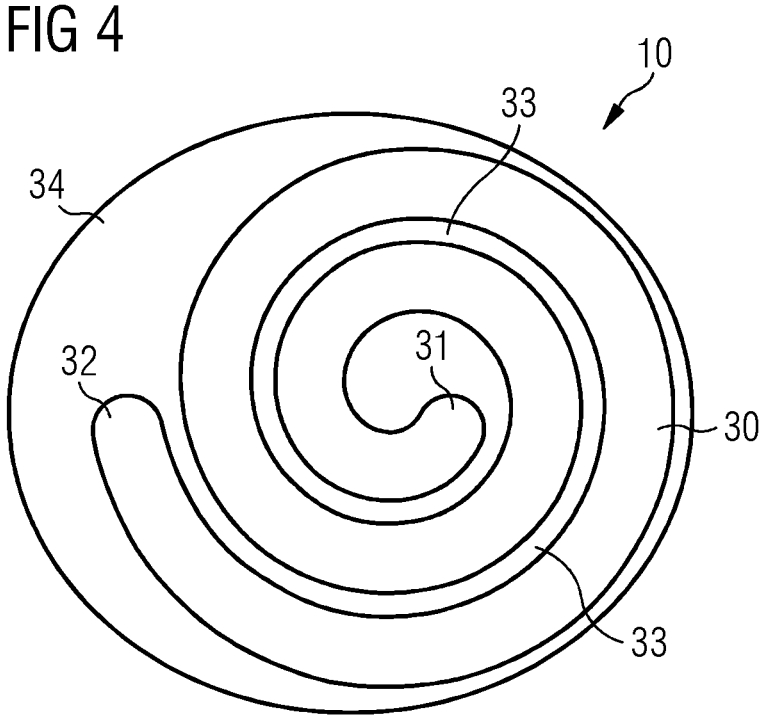
FIG. 4 illustrates a first alternative shape for a sensing element which may be used in the erosion sensor of FIGS. 2 and 3.

FIG. 4 illustrates an example of a first spiral sensing element design, in which the spiral 30 has a substantially constant thickness between a first end 31 of the sensing element in the centre of the sensor and a second end 32 towards the outside. The width of the sensing element 30 is relatively thick, as compared with the width of insulating material 33 separating the sides of the spiral element from the next curve of the spiral. More insulating material 34 fills the space between the outer part of the spiral and the edge of the sensor 10. Multiple sensors of the type shown are then stacked, separated by layers of insulating material, as shown in FIG. 2.

Figure 5:
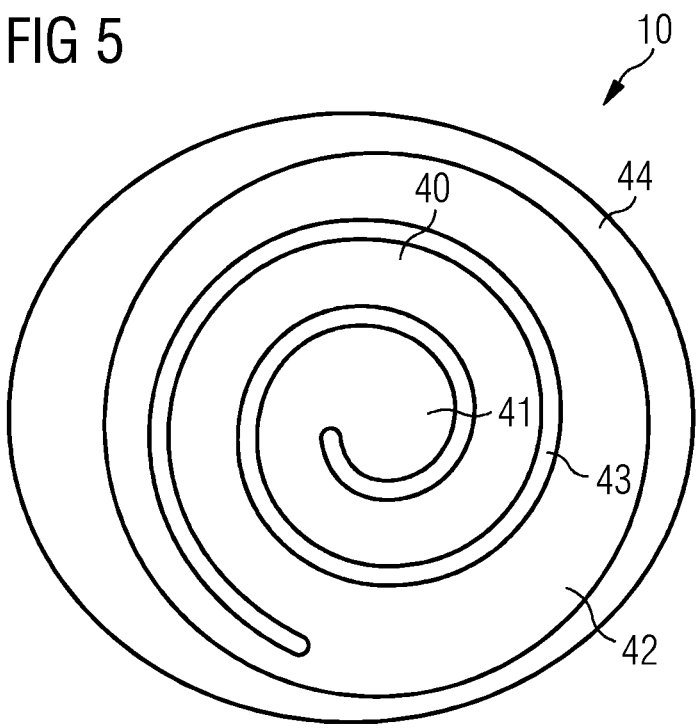
FIG. 5 illustrates a second alternative shape for a sensing element which may be used in the erosion sensor of FIGS. 2 and 3; and, FIG. 6 is a flow diagram illustrating a method of detecting wear in a subsea pipeline, according to the present invention.

FIG. 5 illustrates an alternative example in which the spiral sensor element 40 is not open ended, nor of constant width, but has an inner end 41 that is large enough to receive a conductor contact at the centre and an outer end 42 that actually is continuous all around a section of separating insulation 43. Thus, the functional part of the sensor has a constant thickness when considered as part of a stack of multiple spiral sensors, but the manufacturing and assembly is made easier with the larger central and outer sections. This has the advantage that the second conductor can be connected anywhere around that outer part 42, making manufacture less complex for multiple stacked sensors, each with their own conductor connections. Again, the outer part 44 of the sensor 10 comprises an insulating material.

The subsea erosion sensor 1, 10 is installed in a process fluid pipeline such that at least one of the plurality of individual sensing elements is exposed to the process fluid and the reference sensing element 16 is located such that it is protected from the process fluid. The sensor may be implemented in an intrusive probe design, arranged flush with or angled in the process flow. An electrical or material property is detected in a first sensing element 13, 32, 42 of the plurality of sensing elements and in the reference sensing element 16. The outputs derived from the sensing element 13, 32, 42 and the reference sensing element 16 are compared to determining when the sensing element has been eroded by an amount exceeding a threshold value, so that the system can switching to receive date from the next sensing element. Typically, the detected electrical or material property is converted to a thickness measurement for both the sensing element and the reference element before carrying out the comparison. Although, electrical or material properties may be detected for multiple sensing elements 13, 32, 42 simultaneously, more usually, the detection is for a single sensing element at a time. The sensor is manufactured from multiple sensing elements after the total thickness required to deal with projected erosion in a given environment has been determined.

FIG. 6 is a flow diagram of a measurement method to detect wear, typically caused by erosion. In operation, readings start 20 with a sensing element 13, in this case, element no. 1 (the lefthandmost in FIG. 3). The received readings are compensated for media influence and noise 21 with values obtained from a reference sensor 16, which is subjected to process media, but protected from erosion. Differences in the readings calibrated from a non-worn element indicate wear of the pipeline. Only when the first element has been eroded and either the signal from element no. 1 has been lost entirely, or a change in ohm value on element 13 no. 2 has been detected, do readings continue 21 with element no. 2. The monitoring system may check 22 at intervals whether a particular sensing element is still operating correctly, or whether another sensing element is generating readings. In this example, the elements are numbered 1 to 8 from left to right. The total number of elements and their individual thickness in any subsea erosion sensor are determined for its application and expected lifetime. When element no. 2 has been eroded through, readings start 23 for the next element 13, in this case no. 3. This process continues 23 over the time during which the sensor 10 is installed in the subsea pipeline, until all the elements 13 have been worked through and finally element 13 no. 8 is in operation 24 and eventually ceases, if not replaced by then. In each case, wear values are calculated based on readings received from the currently operational sensing element and the reference element.

Behind element no. 8 is the reference element 16, which is separated from element no. 8 by a thicker insulating layer 14 than the layers 12 which separate each of the measurement sensing elements 13. These are all contained within the body 11. The total number of elements 13 used in a particular sensor 10 depends upon the total thickness calculated to be necessary for the projected erosion environment in which the sensor is to be used over a predetermined period. The stacked electrical resistance erosion sensor 10 may be implemented in any intrusive probe design, whether flush or angled in the process flow.

This particular design allows construction of an erosion sensor with a possible accuracy down to 1 micrometre and a lifespan of up to 20 years, This is because, the decrease in sensing element thickness from the convention single element sensor with a thickness of 6 mm to the sensor of the present invention with sensing elements of 0.25 mm thickness, the resolution of measured resistance value increases 24 times giving the possibilities of measuring smaller erosion loss than the 45 micrometres conventionally possible. In practice, the stacked sensor is able to use sensing elements with a thickness between 0.25 mm and 2 mm without unreasonable loss of accuracy. The sensor 10 may be incorporated into a subsea sensing probe during manufacture, or retrofitted.

As well as improving reliability of the sensors, by in effect having multiple back-ups as each sensing elements wears, there are also cost savings by avoiding the cost of retrieving the subsea installation to change the sensors. Such retrieval operations may run to millions of Euros. By offering operators trustworthy readings for long time periods, which may be in excess of 20 years, adjustments can be made to production to minimize erosion throughout the production life span of the subsea installation, minimising the need for maintenance or replacement of subsea pipelines, or other installations. The sensor may also detect possible pulses of detrimental accumulation of particles caused by reopening of choke valves or from corroded or damaged parts downstream of sensor. Depending on the update rate of the electronics, operation can be shut down before any damage to equipment upstream of the sensor.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea erosion sensor, comprising:
   a plurality of individual sensing elements arranged in a stack; wherein each sensing element is separated from an adjacent sensing element by an electrically non-conducting material;
   a reference sensing element, wherein the reference sensing element is separated from the closest element of the plurality of individual sensing elements, by an electrically non-conducting material; and
   wherein each sensing element has a thickness of at least 0.25 mm, and wherein the erosion sensor further comprises an electrically conducting outer housing containing the sensing elements.

2. The subsea erosion sensor according to claim 1, wherein the electrically non-conducting material comprises a thermoplastic.

3. The subsea erosion sensor according to claim 2, wherein the thermoplastic comprises polyether ether ketone (PEEK).

4. The subsea erosion sensor according to claim 1, wherein each sensing element further comprises electrical conductors electrically connected at each end of the sensing element to measure a material property of the sensing element.

5. The subsea erosion sensor according to claim 4, wherein the electrical conductors comprise a metal alloy.

6. The subsea erosion sensor according to claim 5, wherein the metal alloy comprises a Nickel-Chromium based alloy.

7. The subsea erosion sensor according to claim 5, wherein the metal alloy comprises alloy 625.

8. The subsea erosion sensor according to claim 1, wherein the material of the outer housing comprises a metal alloy.

9. The subsea erosion sensor according to claim 8, wherein the metal alloy comprises alloy 625.

10. The subsea erosion sensor according to claim 1, wherein the erosion sensor comprises at least eight sensing elements.

11. The subsea erosion sensor according to claim 1, wherein each sensing element has a thickness of between 0.25 mm and 0.6 mm.

12. The subsea erosion sensor according to claim 1, wherein the sensing element comprises one of a spiral of constant thickness, a spiral of variable thickness, or a discontinuous circle, square or rectangle, with or without rounded corners.

13. A subsea sensing probe, comprising: a subsea erosion sensor according to claim 1.

14. A method of detecting wear in a subsea erosion sensor according to claim 1, comprising:
    installing the subsea erosion sensor in a process fluid pipeline such that at least one of the plurality of individual sensing elements is exposed to the process fluid and the reference sensing element is located such that it is protected from the process fluid;
    detecting an electrical or material property in a first sensing element of the plurality of sensing elements;
    detecting an electrical or material property in the reference sensing element;
    comparing outputs derived from the sensing element and the reference sensing element; determining when the sensing element has been eroded by an amount exceeding a threshold value;
    switching to a next sensing element of the plurality of sensing elements; and
    converting the detected electrical or material property to a thickness measurement for both the sensing element and the reference element before carrying out the comparison.

15. The method according to claim 14, further comprising: detecting electrical or material properties of multiple erosion sensing elements in the erosion sensor simultaneously.

16. The method according to claim 14, wherein the erosion sensor is implemented in an intrusive probe design, arranged flush with or angled in the process flow.

17. A method of detecting wear in a subsea erosion sensor according to claim 1, comprising:
    installing the subsea erosion sensor in a process fluid pipeline such that at least one of the plurality of individual sensing elements is exposed to the process fluid and the reference sensing element is located such that it is protected from the process fluid;
    detecting an electrical or material property in a first sensing element of the plurality of sensing elements;
    detecting an electrical or material property in the reference sensing element;
    comparing outputs derived from the sensing element and the reference sensing element;
    determining when the sensing element has been eroded by an amount exceeding a threshold value;
    switching to a next sensing element of the plurality of sensing elements; and
    determining a total thickness required to calculate projected erosion in a given environment and installing an erosion sensor having sufficient elements for a projected lifetime.

18. A subsea erosion sensor, comprising:
    a plurality of individual sensing elements arranged in a stack; wherein each sensing element is separated from an adjacent sensing element by an electrically non-conducting material;
    a reference sensing element, wherein the reference sensing element is separated from the closest element of the plurality of individual sensing elements, by an electrically non-conducting material; and
    wherein each sensing element has a thickness of at least 0.25 mm, and wherein a part of the subsea erosion sensor subject to process fluid has a total thickness of at least 2 mm of erodible sensing layers.

* * * * *